United States Patent
Franke et al.

(10) Patent No.: US 9,879,569 B2
(45) Date of Patent: Jan. 30, 2018

(54) METHOD FOR OPERATING A WASTE HEAT UTILIZATION DEVICE

(71) Applicant: Daimler AG, Stuttgart (DE)

(72) Inventors: Andreas Franke, Kornwestheim (DE); Jan Gaertner, Leonberg (DE); Thomas Koch, Pfinztal-Berghausen (DE); Dominik Mall, Gundelsheim (DE)

(73) Assignee: Daimler AG, Stuttgart (DE)

(*) Notice: Subject to any disclaimer, the term of this patent is extended or adjusted under 35 U.S.C. 154(b) by 258 days.

(21) Appl. No.: 14/764,324

(22) PCT Filed: Jan. 14, 2014

(86) PCT No.: PCT/EP2014/000067
§ 371 (c)(1),
(2) Date: Jul. 29, 2015

(87) PCT Pub. No.: WO2014/117914
PCT Pub. Date: Aug. 7, 2014

(65) Prior Publication Data
US 2015/0361832 A1    Dec. 17, 2015

(30) Foreign Application Priority Data
Jan. 30, 2013  (DE) .................... 10 2013 001 569

(51) Int. Cl.
*F01K 23/06*    (2006.01)
*F02G 5/00*    (2006.01)
(Continued)

(52) U.S. Cl.
CPC ............ *F01K 23/065* (2013.01); *F01K 9/003* (2013.01); *F01K 23/10* (2013.01); *F02G 5/00* (2013.01); *F02G 5/02* (2013.01); *Y02T 10/166* (2013.01)

(58) Field of Classification Search
CPC .......... F01N 5/02; F01K 9/003; F01K 23/065; F01K 23/101; F02G 5/02; F02G 2260/00
See application file for complete search history.

(56) References Cited

U.S. PATENT DOCUMENTS

| 5,000,003 A | 3/1991 | Wicks |
| 2005/0072170 A1 | 4/2005 | Taniguchi et al. |

(Continued)

FOREIGN PATENT DOCUMENTS

| CN | 102265002 A | 11/2011 |
| CN | 102414400 A | 4/2012 |

(Continued)

OTHER PUBLICATIONS

PCT/EP2014/000067, International Search Report (PCT/ISA/210) dated May 2, 2014, with partial English translation (Five (5) pages).

(Continued)

*Primary Examiner* — Jonathan Matthias
(74) *Attorney, Agent, or Firm* — Crowell & Moring LLP

(57) ABSTRACT

A method and a device for operating a waste heat utilization device for an internal combustion engine of a motor vehicle is disclosed. The waste heat utilization device contains a waste heat utilization circuit in which a working medium circulates. A conveyor, an evaporator, an expansion machine, and a condenser are disposed in the waste heat utilization circuit. A basic adjustment of the waste heat utilization circuit is provided, which as a function of a heat input into the working medium adjusts the mass flow rate at the conveyor and/or the ratio between high pressure and low pressure at the expansion machine. In addition, a pilot control is provided which recognizes a change of the operating point of the internal combustion engine and, when the operating point is changed, controls the condensation output of the condenser in accordance with a mass distribution of (Continued)

the working medium in the waste heat utilization circuit optimized to the new operating point.

9 Claims, 1 Drawing Sheet

(51) Int. Cl.
  *F02G 5/02* (2006.01)
  *F01K 9/00* (2006.01)
  *F01K 23/10* (2006.01)

(56) References Cited

U.S. PATENT DOCUMENTS

| | | | |
|---|---|---|---|
| 2005/0072182 A1* | 4/2005 | Taniguchi | F01K 9/00 62/467 |
| 2010/0307155 A1 | 12/2010 | Kasuya et al. | |
| 2011/0048012 A1* | 3/2011 | Ernst | F01K 9/003 60/651 |
| 2011/0056202 A1 | 3/2011 | Gaertner et al. | |
| 2012/0060502 A1 | 3/2012 | Gaertner et al. | |
| 2012/0090321 A1 | 4/2012 | Gaertner et al. | |
| 2012/0096857 A1 | 4/2012 | Gaertner et al. | |

FOREIGN PATENT DOCUMENTS

| | | |
|---|---|---|
| CN | 102422007 A | 4/2012 |
| DE | 10 2007 062 580 A1 | 6/2009 |
| DE | 10 2008 057 202 A1 | 5/2010 |
| EP | 2 312 136 A1 | 4/2011 |

OTHER PUBLICATIONS

German Search Report dated Aug. 9, 2013, with Statement of Relevancy (Six (6) pages).

Chinese Office Action issued in Chinese counterpart application No. 201480006588.X dated Dec. 4, 2015, with partial English translation (Twelve (12) pages).

* cited by examiner

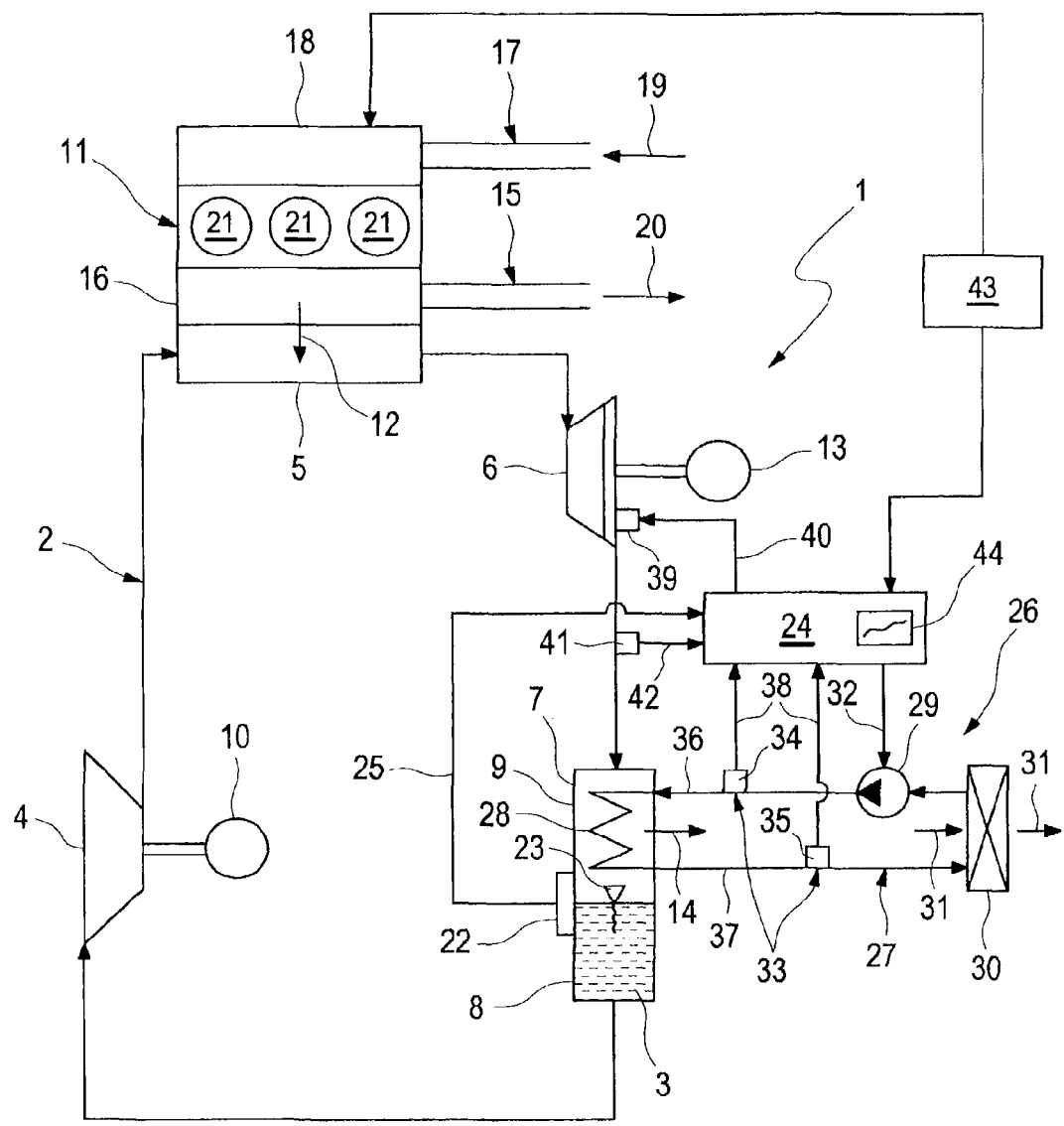

METHOD FOR OPERATING A WASTE HEAT UTILIZATION DEVICE

BACKGROUND AND SUMMARY OF THE INVENTION

The present invention relates to a method for operating a waste heat utilization device for an internal combustion engine of a motor vehicle. The invention also relates to an associated waste heat utilization device.

A waste heat utilization device for an internal combustion engine, in particular a motor vehicle, with a waste heat utilization circuit in which a working medium is circulated, is known from DE 10 2008 057 202 A1. A conveyor for conveying the liquid working medium against a high pressure is disposed in the waste heat utilization circuit. Furthermore, an evaporator for vaporizing the liquid working medium is disposed in the waste heat utilization circuit downstream of the conveyor. For this purpose the evaporator extracts heat from the internal combustion engine. In the waste heat utilization circuit an expansion machine for expanding the gaseous working medium to a low pressure is disposed downstream of the evaporator. A condenser for condensing the gaseous working medium is disposed downstream of the expansion machine in the waste heat utilization circuit. In the condenser heat is removed from the waste heat utilization circuit. This may be achieved for example by means of a cooling device which comprises a cooling circuit in which a coolant is circulated and which is coupled to the condenser for heat transfer. To this end a control unit may be provided for adjusting the quantity of working fluid circulating in the Clausius-Rankine circuit as a function of the current operational state of the Clausius-Rankine circuit, the control device being configured so that it adjusts the quantity of working fluid circulating in the Clausius-Rankine circuit by changing the condensation output of the condenser, in particular by changing the quantity of cooling fluid flowing through the heat exchanger. Furthermore, a collector for storing the liquid working medium is disposed in the waste heat utilization circuit upstream of the conveyor. In the known waste heat utilization device provision is made for integrating the collector in the condenser. Moreover provision is made for adjusting the waste heat utilization circuit according to the current operating point of the waste heat utilization circuit by changing the condenser output by means of a control valve in the cooling circuit. This adjustment effects a change in the working medium mass distribution in the waste heat utilization circuit.

Such an adjustment of the waste heat utilization circuit only by means of the adjustment of the condenser output on the basis of the current operating point of the waste heat utilization circuit is slow and only optimizable to a limited extent, for example with regard to a high output yield.

The working medium mass distribution is definitive for optimized high pressure in the waste heat utilization circuit and thus for the gradient between high and low pressure at the expansion machine, the optimized output occurring at the expansion machine. However, in vehicle applications the problem exists that the internal combustion engine which is used as a heat source for operating the waste heat utilization device, namely for delivering heat to the evaporator, is frequently operated transiently or has many different steady-state operating points, at which in particular different amounts of heat are provided for output to the waste heat utilization device.

However, if in such transient states of the internal combustion engine the heat available to the evaporator changes, the mass of the gaseous working medium in the waste heat utilization circuit changes. Consequently a change occurs to the high pressure in the gaseous working medium, that is to say between the evaporator and the expansion machine. This leads to an "imbalance" in the system, which can only be compensated comparatively slowly by a conventional adjustment system, which reduces the efficiency of the waste heat utilization device and the output thereof.

With this as the starting point, the object of the present invention is to provide an improved embodiment of a waste heat utilization device or an associated method for operation thereof, which is characterized in particular by an improved overall efficiency or by a fast adaptation to fluctuations in the amount of heat available to the evaporator.

The method according to the invention is characterized in that a basic adjustment of the waste heat utilization circuit is provided, which as a function of a heat input into the working medium adjusts the mass flow rate at the conveyor and/or the ratio between high pressure and low pressure at the expansion machine, and that in addition to this a pilot control is provided, which recognizes a change of the operating point of the internal combustion engine and, when the operating point of the internal combustion engine changes, controls the condensation output of the condenser in accordance with a mass distribution of the working medium in the waste heat utilization circuit optimized to the new operating point.

The waste heat utilization device according to the invention is characterized by a basic adjustment device with a control unit which is connected to the conveyor and/or the expansion machine for controlling or adjusting the waste heat utilization device, and by a pilot control unit for pilot control of the condensation output of the condenser, with a control unit which acts on a cooling performance adjustment device and, when the operating point of the internal combustion engine changes, controls the condensation output of the condenser in accordance with a mass distribution of the working medium in the waste heat utilization circuit optimized to the new operating point.

The invention is based on the general idea of combining a slow basic adjustment with a fast-acting load change adjustment or load change pilot control. A pump and/or expander adjustment is provided as the basic adjustment. The conveyor is typically a volumetric pump which is characterized in that its flow rate is independent of the counter-pressure and in particular is only dependent upon its speed. The high pressure in the waste heat utilization circuit is determined in this case by the expansion machine.

In addition, during a transient operational state of the internal combustion engine, that is to say in the event of a change from an old operating point to a new operating point, the condensation output of the condenser can be temporarily changed so that with regard to the new operating point a displacement of the mass distribution occurs in the waste heat utilization circuit. Thus already in the context of a pilot control, fluctuations and imbalances, which are expected due to the change of operating point, can be at least roughly compensated. Such a pilot control acts and must not react like a conventional adjustment, since the time lag until an adjusting intervention can take place is comparatively long because of the inertia of the thermal mass of the waste heat utilization circuit. In particular according to the method presented here the condensation output of the condenser can be temporarily changed so that a distribution of the mass of the liquid working medium and the mass of the gaseous working medium in the waste heat utilization circuit shifts from an old mass distribution value associated with the old operating point to a new mass distribution value associated with the new operating point.

The operating points of the internal combustion engine may be defined for example by the speed of the internal combustion engine and/or the load applied to the internal combustion engine. In particular such parameters which correlate with the operating point, such as for example speed and load, are available in an engine control unit provided for operation of the internal combustion engine.

According to a preferred embodiment the association of the mass distribution values with the operating points of the internal combustion engine with a view to optimized output can take place at the expansion machine. This may for example take place by constant attempts to set an optimal high pressure or an optimal gradient between high and low pressure. Additionally or alternatively it may also be provided that the association between the operating point of the internal combustion engine and the mass distribution value is implemented by means of at least one characteristic curve or at least one characteristic field. Characteristic fields or characteristic curves have proved worthwhile in practice and can in particular be determined empirically in order to obtain reliable associations between the mass distribution values and the operating points.

For a change of the condensation output of the condenser, according to an advantageous embodiment provision may be made for altering the cooling performance of a cooling unit which is coupled to the condenser for heat transfer. In an embodiment of the method the control of the condensation output of the condenser takes place by means of a change of a mass flow of a coolant in the condenser. A change of the supply of heat to the waste heat utilization circuit, which is expected on the basis of a change of operating point of the internal combustion engine, prompts the pilot control to change the heat removal from the waste heat utilization circuit. That is to say the pilot control adapts the external effects of the waste heat utilization circuit to one another at an early stage. Therefore the basic control of the waste heat utilization circuit can operate without fast and extensive change.

According to another advantageous embodiment, in order to change the cooling performance of the cooling unit, the mass flow rate of a coolant which circulates in a cooling circuit coupled to the condenser for heat transfer can be changed. Furthermore, in order to change the mass flow rate of the cooling agent, provision may optionally be made for changing the conveying capacity, in particular the speed, of a conveying device which is disposed in the cooling circuit and drives the coolant. In this embodiment of the device the cooling performance adjustment device is designed as an adjustable cooling circuit pump. This is typically already present in the cooling circuit, so that no additional component is required.

In an alternative or supplementary embodiment of the device the cooling performance adjustment device is designed as an adjustable bypass of the condenser cooling circuit. Thus the amount of cooling medium which cools the condenser per unit of time can be adjusted.

In one embodiment of the method the change in the mass distribution of the working medium is detected by means of a filling level measuring device disposed in the collector. For this purpose in one embodiment of the device a filling level measuring device is provided in the collector. This constitutes a simple possibility for establishing the success of the method and reaching a target value. Alternatively a theoretical determination of the filling level is possible by means of a characteristic field or by calculation.

In an embodiment of the device a temperature measuring device is provided for measuring at least a temperature of a coolant which circulates in a cooling circuit of a cooling unit provided for removing heat from the condenser and the control unit is coupled to the temperature measuring device and is configured and/or programmed for changing the cooling performance of the cooling unit. Thus the temperature of the coolant can be detected in order to determine the mass of coolant required for a desired cooling performance per unit of time.

Advantageously, therefore, the cooling performance of the coolant can be adjusted so that the mean value of the feed line temperature and return line temperature of the coolant at the condenser is below the dew point of the working medium in particular by a predetermined value. In an embodiment of the device, therefore, the temperature measuring device has a feed line temperature sensor for detecting the temperature of the coolant before the condenser and a return line temperature sensor for detecting the temperature of the coolant after the condenser. The difference between the feed line temperature and the return line temperature corresponds to the heat input of the waste heat utilization circuit into the cooling medium.

The waste heat utilization device according to the invention is equipped with a control unit which is coupled to a control device, in particular an engine control unit, of the internal combustion engine and which serves for controlling and/or adjusting a condensation output of the condenser. In this case the control unit is programmed or configured so that in the event of a change from an old operating point of the internal combustion engine to a new operating point of the internal combustion engine the condensation output of the condenser is temporarily changed so that a distribution of the mass of the liquid working medium and the mass of the gaseous working medium in the waste heat utilization circuit shifts from an old mass distribution value associated with the old operating point to a new mass distribution value associated with the new operating point.

In an advantageous modification a cooling unit can be provided for removing heat from the condenser, wherein the control unit is then configured or programmed for controlling and/or adjusting a cooling performance of the cooling unit as a function of the filling level of the liquid working medium in the collector.

A particularly compact construction for the waste heat utilization device can be achieved if a collector, which is provided in the waste heat utilization circuit upstream of the conveyor for storage of the liquid working medium, is formed in a housing of the condenser. The collector and condenser are then integrated into one another.

Further important features and advantages of the invention are disclosed in the drawings and the associated description of the figures of the drawings.

It will be understood that the features referred to above and still to be explained below can be used not only in the respectively specified combinations but also in other combinations or alone without departing from the scope of the present invention.

Preferred embodiments of the invention are illustrated in the drawings and are explained in greater detail in the following description.

BRIEF DESCRIPTION OF THE DRAWING

FIG. 1 shows a schematic diagram, like a circuit diagram, of a waste heat utilization device.

DETAILED DESCRIPTION OF THE DRAWING

According to FIG. 1 a waste heat utilization device 1 has a waste heat utilization circuit 2 in which a working medium 3 is circulated. In the waste heat utilization circuit 2 a conveyor 4, an evaporator 5, an expansion machine 6 and a condenser 7 are disposed one behind the other in the direction of circulation. Furthermore a collector 8, which in the example of FIG. 1 is integrated in the condenser 7, is disposed upstream of the conveyor 4 in the waste heat utilization circuit 2. To this end the collector 8 and the condenser 7 are disposed in a common housing 9.

The conveyor 4 serves for conveying the liquid working medium against a high pressure. The conveyor 4 is for example connected for drive purposes to an engine 10. The evaporator 5 serves for vaporizing the liquid working medium. For this it uses the waste heat from an internal combustion engine 11. The heat input into the waste heat utilization circuit 2 is indicated by an arrow 12. The expansion machine 6 serves for expanding the gaseous working medium to a low pressure. In a preferred embodiment the expansion machine 6 is adjustable, so that with the aid thereof the high pressure, the low pressure and/or the delta between high pressure and low pressure can be set. In the expansion of the gaseous working medium the expansion machine 6 provides mechanical work which can be used for example for driving a generator 13. The condenser 7 serves for condensing the gaseous working medium. For this purpose heat is extracted from the working medium or the waste heat utilization circuit 2. This removal of heat from the waste heat utilization circuit 2 is indicated by an arrow 14. The collector 8 serves for storing the liquid working medium 3.

With the aid of the waste heat utilization device 1 waste heat from the internal combustion engine 11 can be used for example in order to drive the generator 13 or an auxiliary unit of the internal combustion engine or to support the internal combustion engine in its drive output. In the example the evaporator 5 is coupled for heat transfer to an exhaust gas system 15 which, when the internal combustion engine 11 is in operation, removes the exhaust gases therefrom. Specifically, in the example the evaporator 5 is coupled to an exhaust manifold 16 of the exhaust gas system 15 for heat transfer, the manifold receiving the exhaust gas coming from the internal combustion engine 11 and effectively forming the inlet region of the exhaust gas system 15. The proposed solution is particularly advantageous for this exhaust gas heat utilization, since here the supply of heat fluctuates very considerably as a function of the operating point of the internal combustion engine. However, it is also conceivable that the waste heat utilization device 1 uses several or different heat sources of the internal combustion engine. For example the evaporator 5 may be disposed in the exhaust gas system after the catalyst or in an exhaust gas recirculation system or the evaporator can use the waste heat from the cooling water. Furthermore the internal combustion engine 11 is connected to a fresh air system 17 which is connected by means of a fresh air distributor 18 to the internal combustion engine 11. In this case a fresh air flow is indicated by an arrow 19. The exhaust gas flow is indicated by an arrow 20. The internal combustion engine 11 is for example a piston engine which is indicated by cylinders 21.

The waste heat utilization device 1 can optionally be equipped with a filling level measuring device 22, by means of which a level or filling level 23 of the liquid working medium 3 in the collector 8 can be measured.

Such a filling level measuring device 22 can be designed for example as a float, vibration sensor, rotor switch, electromagnetic sounding system, pressure measuring device, hydrostatic measuring device, differential pressure measuring device, conductivity measuring device, capacitive measuring device, optical measuring arrangement, ultrasound device, microwave device, radar device or radiometric device.

Independently of such a filling level measuring device 22, the waste heat utilization device 1 is equipped with a control unit 24 which can be coupled on the input side by means of a corresponding signal line 25 for example to the filling level measuring device 22. Moreover the control unit 24 is coupled to a control device 43 which provides parameters which correlate with the current operating point of the internal combustion engine 11. For example a speed of the internal combustion engine and/or a load of the internal combustion engine can be used in order to describe the current operating point of the internal combustion engine. Such parameters can for example be retrieved in an engine control unit which serves for operation of the internal combustion engine. Thus the control device 43 is preferably such an engine control device.

The control unit 24 is configured or programmed so that in the event of a change from an old operating point of the internal combustion engine 11 to a new operating point of the internal combustion engine 11 the condensation output of the condenser 7 is changed in such a way that a distribution of the mass of the liquid working medium 3 and the mass of the gaseous working medium 3 in the waste heat utilization circuit 2 shifts from an old mass distribution value associated with the old operating point to a new mass distribution value associated with the new operating point. Typically this change of the condensation output is not permanent, but for a temporary time period, until the new mass distribution value associated with the new operating point is reached. If the operating point shifts again, the control unit again changes the condensation output according to the requirements of the new operating point. In this case the condensation output during the changing of the operating point can be associated with a fixed value or a variable value, such as for example a condensation output curve.

The control unit 24 can influence or change the condensation output of the condenser 7, which has a direct effect on the mass distribution of the liquid working medium 3 and of the gaseous working medium 3 within the waste heat utilization circuit 2 and thus also on the filling level 23. The waste heat utilization device 1 is equipped with a cooling unit 26 which is coupled for heat transfer to the condenser 7 in order to enable the extraction of heat 14. In this case the extraction of heat 14 correlates with the cooling performance of the cooling unit 26 at the heat transfer system 28. Consequently in order to change the condensation output of the condenser 7, the control unit 24 can change the cooling performance of the cooling unit 26 at the heat transfer system 28.

In the embodiment illustrated in FIG. 1, the cooling unit 26 has a cooling circuit 27 in which a cooling agent circulates. The cooling circuit 27 is coupled for heat transfer to the condenser 7, for example by means of a heat transfer system 28. A coolant conveying device is typically disposed in the cooling circuit 27 for driving the coolant in the cooling circuit 27. In the embodiment illustrated here the coolant conveying device is designed as a cooling performance adjustment device 29.

Moreover, in the embodiment illustrated here the cooling circuit 27 contains a cooler 30 which typically can be supplied with an air flow 31, indicated by arrows, in order to extract heat from the coolant.

In one embodiment the control unit 24 can advantageously be coupled to the cooling performance adjustment device 29 by means of a corresponding control line 32. The control unit 24 can control the cooling performance adjustment device 29 by means of the control line 32. In the embodiment illustrated here the cooling performance adjustment device 29 is designed as an adjustable coolant conveying device. In this case the control unit 24 can vary the output of the coolant conveying device, for example the speed thereof, by means of the control line 32.

In an alternative embodiment which is not illustrated, the cooling performance adjustment device 29 is designed as an adjustable coolant bypass. In this case the coolant bypass 29 connects a feed line 36, which leads to the condenser 7, of the cooling circuit 27 to a return line 37 of the cooling circuit 27 leading away from the condenser 7 and bypasses the heat transfer system 28. By a change to the output of the coolant bypass 29 the sub-division of the mass flow rate of the coolant between the feed line 36 and coolant bypass 39 in the cooling circuit 27 can be changed, which changes the cooling performance of the cooling device 26 at the heat transfer system 28 and thus at the condenser 7.

In the embodiment shown here a temperature measuring device 33 is provided for taking the coolant temperature into consideration. In the embodiment illustrated in FIG. 1 the temperature measuring device 33 includes two temperature sensors, namely a feed line temperature sensor 34 and a return line temperature sensor 35. The feed line temperature sensor 34 is disposed in a feed line of the cooling circuit 27 leading to the condenser 7. The return line temperature sensor 35 is disposed in a return line 37 of the cooling circuit 27 leading away from the condenser 7. By means of corresponding signal lines 38 the control unit 24 is coupled to the temperature sensors 34, 35 or to the temperature measuring device 33. In particular the control unit 24 can form a mean value from the feed line temperature and return line temperature and can use this mean value as the coolant temperature. This coolant temperature correlates with the cooling performance of the cooling circuit 27. The cooling circuit 27 may be designed for example as a partial circuit of the cooling circuit of the internal combustion engine, as an internal combustion engine cooling circuit or as a separate condenser cooling circuit.

Furthermore, in the example a pressure sensor 39 is indicated which can measure the pressure in the gaseous working medium between the expansion machine 6 and the condenser 7. The pressure sensor 39 is connected to the control unit 24 by means of a corresponding signal line 40. Thus it is possible for the control unit to determine more precisely the required condensation output which is dependent upon the pressure.

The illustrated waste heat utilization device 1 according to the invention combines a basic adjustment with an active pilot control (operating independently thereof). For this purpose an adjustment of the basic setting of the waste heat utilization circuit 2 is provided by means of the adjustable expansion machine 6. Alternatively or additionally an adjustment of the basic setting of the waste heat utilization circuit 2 can be provided by means of an adjustable conveyor 4. This basic adjustment is optimized to the current operating point of the waste heat utilization circuit 2. Typically the basic setting takes place with the aim of the greatest possible efficiency of the waste heat utilization circuit 2 (likewise an adjustment with optimization of other features is conceivable). This basic adjustment reacts relatively slowly. In the event of a load change of the internal combustion engine 11 and an associated changed heat input into the waste heat utilization circuit 2, this adjustment can only adapt relatively slowly to the new operating point. In the transition phase the performance of the waste heat utilization circuit 2 is not optimal.

Therefore according to the invention an active pilot control of the waste heat utilization circuit 2 is additionally provided as a function of operating parameters of the internal combustion engine 11, and this pilot control should initially take up or compensate for an imbalance of the waste heat utilization circuit 2 caused by a change of operating point of the internal combustion engine 11. For this purpose it is provided that in the event of a change of the operating point of the internal combustion engine 11 the mass distribution of the working medium in the waste heat utilization circuit 2 changes and is adapted to the new operating point of the internal combustion engine 11 before the changed heat input into the waste heat utilization circuit 2 unbalances the circuit. This is achieved by changing the condensation output of the condenser 7.

With the aid of the control unit 24 the condensation output of the condenser 7 is controlled or adjusted so that in the event of a change from an old operating point of the internal combustion engine 11 to a new operating point of the internal combustion engine 11 the condensation output of the condenser 7 can be changed variably (e.g. temporarily for a predetermined time period, permanently or variably) in such a way that a distribution of the mass of the liquid working medium 3 and the mass of the gaseous working medium 3 in the waste heat utilization circuit 2 shifts from an old mass distribution value associated with the old operating point to a new mass distribution value associated with the new operating point.

The control unit 24 receives from the control device 43 the data, which are changing over time, of the current operating point of the internal combustion engine. With the aid of at least one characteristic curve 44 or by means of at least one characteristic field 44 the control unit 24 can determine a mass distribution value corresponding to the respective operating point and as a function thereof can set the cooling performance of the cooling unit 26 or the condensation output of the condenser 7.

If for example the heat input 12 increases, this would lead to an increase in the high pressure. At the same time a shift of the mass of the working medium 3 in the direction of the gas phase would occur. This is actively counteracted by the control unit 24 as, already in the event of change of the operating point of the internal combustion engine 11 and still before the associated changed heat input reaches the waste heat utilization circuit 2, the cooling performance of the cooling unit 26 increases in order thus to increase the condensation output of the condenser 7. In this way more liquid working medium can be produced, which balances the mass displacement or pre-empts the necessary balancing.

Finally, taking account of a change of operating points of the internal combustion engine 11 as presented here brings about a presetting or pilot control for shifting the mass distribution within the waste heat utilization circuit 2, in order to reduce the expected negative effects of the changed operating point on the high pressure and thus on the coordination of the system, so that the adjustment effort which is actually still necessary for the basic adjustment can be reduced and the time required for adaptation of the waste heat utilization device 1 to the new operating point is considerably reduced.

The invention claimed is:

1. A method for operating a waste heat utilization device for an internal combustion engine of a motor vehicle, wherein the waste heat utilization device includes:
   a waste heat utilization circuit in which a working medium circulates;
   a conveyor disposed in the waste heat utilization circuit for conveying the working medium against a high pressure;
   an evaporator disposed downstream of the conveyor in the waste heat utilization circuit for vaporizing the working medium;
   an expansion machine disposed downstream of the evaporator in the waste heat utilization circuit for producing mechanical energy by expanding the working medium in a gaseous state to a low pressure;
   a condenser disposed downstream of the expansion machine in the waste heat utilization circuit for condensing the gaseous working medium; and
   a cooling circuit, wherein the cooling circuit cools the condenser,
   the method comprising the steps of:
   providing the conveyor and/or the expansion machine that are adjustable independently of the cooling circuit;
   providing a basic adjustment of the waste heat utilization circuit which, as a function of a heat input into the working medium, adjusts a mass flow rate at the conveyor and/or a ratio between high pressure and low pressure at the expansion machine; and
   providing a pilot control which recognizes a change of an operating point of the internal combustion engine, and when the operating point changes, controls a condensation output of the condenser such that a mass distribution of the working medium in the waste heat utilization circuit changes and is adapted to a new operating point.

2. The method according to claim 1, wherein the control of the condensation output of the condenser takes place by a change of a mass flow of a coolant in the condenser.

3. The method according to claim 1, wherein the change in the mass distribution of the working medium is detected by a filling level measuring device disposed in a collector.

4. A waste heat utilization device for an internal combustion engine of a motor vehicle, comprising:
   a waste heat utilization circuit in which a working medium circulates;
   a conveyor disposed in the waste heat utilization circuit, wherein the working medium is conveyed by the conveyor against a high pressure;
   an evaporator disposed downstream of the conveyor in the waste heat utilization circuit, wherein the working medium is vaporized by the evaporator;
   an expansion machine disposed downstream of the evaporator in the waste heat utilization circuit, wherein the expansion machine produces mechanical energy by expanding the working medium in a gaseous state to a low pressure;
   a condenser disposed downstream of the expansion machine in the waste heat utilization circuit, wherein the condenser condenses the gaseous working medium;
   a collector, wherein the collector stores the condensed working medium;
   a cooling circuit, wherein the cooling circuit cools the condenser;
   wherein the conveyor and/or the expansion machine are adjustable independently of the cooling circuit;
   a basic conveyor- or expansion machine-adjusting device which is connected to the conveyor or the expansion machine, respectively, wherein the basic conveyor- or expansion machine-adjusting device controls or adjusts the waste heat utilization device; and
   a pilot controller, wherein the pilot controller controls a condensation output of the condenser with a controller which controls a cooling performance adjustment device and, when an operating point of the internal combustion engine changes, controls the condensation output of the condenser such that a mass distribution of the working medium in the waste heat utilization circuit changes and is adapted to a new operating point.

5. The device according to claim 4, wherein a filling level measuring device is disposed in the collector.

6. The device according to claim 4, wherein the cooling performance adjustment device is an adjustable bypass of the condenser cooling circuit.

7. The device according to claim 4, wherein the cooling performance adjustment device is an adjustable cooling circuit pump.

8. The device according to claim 4, further comprising:
   a temperature measuring device, wherein the temperature measuring device measures a temperature of a coolant which circulates in the cooling circuit;
   wherein the controller is coupled to the temperature measuring device and wherein a cooling performance of the cooling circuit is changeable by the control unit controller.

9. The device according to claim 8, wherein the temperature measuring device has a feed line temperature sensor which detects a temperature of the coolant before the condenser and a return line temperature sensor which detects a temperature of the coolant after the condenser.

* * * * *